United States Patent [19]

Thomas et al.

[11] Patent Number: 5,381,300
[45] Date of Patent: Jan. 10, 1995

[54] CAPACITIVE MICRO-SENSOR WITH A LOW STRAY CAPACITY AND MANUFACTURING METHOD

[75] Inventors: Isabelle Thomas; Pierre O. LeFort; Christophe Legoux, all of Valence, France

[73] Assignee: Sextant Avionique, Cedex, France

[21] Appl. No.: 20,079

[22] Filed: Feb. 19, 1993

[30] Foreign Application Priority Data

Feb. 20, 1992 [FR] France .............. 92 02190

[51] Int. Cl.⁶ .............................................. G01P 15/125
[52] U.S. Cl. ................... 361/280; 361/283.2; 361/283.4; 73/517 R
[58] Field of Search ............ 361/280, 283.1, 283.2, 361/283.3, 283.4; 29/25.41, 25.42; 177/210.6; 73/718, 715, 517 R

[56] References Cited

U.S. PATENT DOCUMENTS

| | | | |
|---|---|---|---|
| 4,257,274 | 3/1981 | Shimada | 73/718 |
| 4,930,043 | 5/1990 | Wiegano | 361/283.2 |
| 5,006,487 | 4/1991 | Stokes | 437/228 |
| 5,228,341 | 7/1993 | Tsuchitani | 73/517 R |

FOREIGN PATENT DOCUMENTS 0369352  5/1990  European Pat. Off. .

*Primary Examiner*—Bruce A. Reynolds
*Assistant Examiner*—Michael D. Switzer
*Attorney, Agent, or Firm*—Lowe, Price, LeBlanc & Becker

[57] ABSTRACT

A capacitive micro-sensor includes a sandwich of three silicon wafers, a peripheral stripe of each surface of the central plate being assembled to a corresponding stripe of an opposing external plate through an insulating layer. At least one of the external plates forms a first electrode, the central plate forms a second electrode and at least one portion of the central plate forms a variable capacity with at least one of the external layers. At least one of the insulating layers is formed by a sandwich of a first insulating layer, a conductive layer and a second insulating layer, the conductive layer being associated with connection means.

6 Claims, 4 Drawing Sheets

CAPACITIVE MICRO-SENSOR WITH A LOW STRAY CAPACITY AND MANUFACTURING METHOD

BACKGROUND OF THE INVENTION

1. Field of the Invention

The present invention relates to silicon capacitive micro-sensors. Such micro-sensors are, for example, pressure sensors, acceleration sensors, and so forth.

2. Discussion of the Related Art

Over the last years, new silicon micro-sensors have been developed, taking advantage of the silicon etching techniques developed for the manufacturing of semiconductor electronic components. Initially, such micro-sensors were formed by the combination of suitably etched silicon plates and thin glass plates serving as airtight chamber or as separating insulating plates inserted between the silicon plates, these glass plates bearing various metal electrode patterns.

Nowadays, the trend is to develop micro-sensors entirely made of silicon, without any glass plate having an active function. Schematic examples of such sensors are shown in FIGS. 1 and 2.

FIG. 1 shows an acceleration sensor; FIG. 2 shows a pressure sensor. Each of these sensors includes a central silicon plate 1 sandwiched between external silicon plates 2 and 3. Insulation between the plates is ensured by a first insulating stripe, usually a silicon oxide layer, 5, between plates 1 and 2, and a second insulating stripe, 6, between plates 1 and 3. Such frame-shaped insulating stripes are disposed between adjacent plates, along the edges of the latter. Oxide layers are grown or deposited on one of the adjacent plates. Once the three plates are assembled, welding is carried out by annealing at a temperature within the range of 900° to 1100° C. To achieve this purpose, experiment shows that the silicon and silicon oxide surfaces facing each other must have a very slight roughness, for example lower than 0.5 nm. The external silicon plates 2 and 3 define between themselves and with the frame portion of the silicon plate 1 a region in which a controlled atmosphere is contained, such as an atmosphere below atmospheric pressure, referred to as a vacuum.

The above description commonly applies to the micro-sensors of FIGS. 1 and 2.

In the example of FIG. 1, which is a schematic cross-sectional view of an accelerometer, the central silicon plate 1 is etched before being assembled in order to include a frame and an intermediate plate or inertia block 8 fixed to the frame by thin suspension rods 9. A single rod is shown in the schematic cross-sectional drawing of FIG. 1. Conventionally, two-rod or four-rod suspension systems are used. The external plates 1 and 3 delineate a vacuum cavity with the frame formed at the periphery of the central plate. The capacitance variations between the upper surface of the inertia block and the silicon plate 3 are detected and also, if required, between the lower surface of the inertia block and the lower plate 2. When the device is subject to acceleration, inertia block 8 moves with respect to the whole device, causing the above-mentioned capacities to vary. Additionally, an electrostatic control is generally provided in order to maintain the inertia block in place by applying a d.c. electric field; it is then the error signal which indicates the capacity variation.

FIG. 2 schematically shows a structure forming a pressure sensor. The lower plate 2 is etched in order to form a thin diaphragm 11. Plate 1 is etched to form a stud 12 contacting the diaphragm. A silicon strip 13 extends between stud 12 and the frame of plate 1. Again, the area delineated by the upper plate, the lower plate and the frame of the central plate defines a vacuum cavity. Variations of the external pressure deform diaphragm 11 and creates stresses in strip 13. This stress variation causes variation of the resonance frequency of the capacitive resonator formed by strip 13 (vibrating beam) and the opposing surface of plate 3. Preferably, the internal side of plate 3 is etched in order to form a protruding stripe facing strip 13.

In the example of FIG. 1, electrodes 21, 22 and 23 must be coupled to plates 1, 2 and 3, respectively. In the example of FIG. 2, only electrodes 21 and 23 are required.

The drawback of these prior art structures, directly measuring either a capacity or a resonance frequency, is that measurements are substantially impaired by the presence of high stray capacities. Such stray capacities mainly correspond to the capacities between the frame formed in plate 1 and the opposed portions of the upper and/or lower plate, the dielectric of these capacities being formed by the silicon oxide insulating layers 5 and 6.

SUMMARY OF THE INVENTION

An object of the invention is to provide a micro-sensor structure avoiding the detrimental effect of these stray capacitances.

To achieve this object, the invention provides a capacitive micro-sensor including a sandwich of three silicon plates, a peripheral stripe of each side of the central plate being assembled to a matching stripe of the opposing surface of an external plate through an insulating layer. At least one of the external plates forms a first electrode, the central plate forms a second electrode and at least one portion of the central plate forms a variable capacity with at least one of the external plates. At least one of the insulating layers is formed by a sandwich of a first insulating layer, a conductive layer and a second insulating layer. The conductive layer is associated with connection means.

When the capacitive micro-sensor constitutes an accelerometer, the above-mentioned portion of the central plate forms an inertia block.

When the capacitive micro-sensor forms a pressure sensor, the lower plate includes a thinner portion forming a diaphragm. The central plate includes a stud mounted onto the diaphragm, and a stripe extending between the stud and a peripheral portion of the central plate. The stripe forms with the upper plate a capacitive resonator whose characteristics vary as a function of the applied pressure.

According to an embodiment of the invention, the conductive layer is set (possibly in a floating way) to the reference voltage of the central plate.

According to an embodiment of the invention, the first and second insulating layers are of silicon oxide and the conductive layer is of polysilicon.

According to an embodiment of the invention, the first and second insulating layers are of silicon oxide and the conductive layer is of single-crystal silicon.

The invention also provides a method for manufacturing a capacitive micro-sensor comprising the steps of etching the central plate in order to form a frame and a sensitive central portion, the two surfaces of the frame being plated with a silicon oxide layer; forming on one side of each external plate, facing the central plate, a frame constituted by the superimposition of a silicon oxide layer and a polycrystalline silicon layer; and assembling the external plates with the central plate.

The invention also provides a method for manufacturing a capacitive micro-sensor comprising the steps of etching the central plate according to the desired pattern; forming in each external plate a deep implantation of oxygen annealed in order to form a buried silicon oxide layer; oxidizing the external plate, and etching the external plate until crossing the external silicon oxide layer, the central single-crystal silicon layer and the buried oxide layer to leave only a frame in place; and assembling the external plates and the central plate.

The foregoing and other objects, features, aspects and advantages of the invention will become apparent from the following detailed description of the present invention when taken in conjunction with the accompanying drawings.

In the various drawings, the relative thicknesses of the various layers and the lateral sizes of the various elements are not to scale but are arbitrarily drawn in order to facilitate the legibility of the drawings.

Also, in the various figures, the lateral surfaces of the various silicon plates are shown as being obliquely etched since it is the aspect of these lateral surfaces once silicon anisotropic etching along planes (1, 1, 1) has been carried out. However, it will be noted, on the one hand, that this particular aspect of the present invention is not intended as limiting and, on the other hand, that the angle shown on the drawings is arbitrary. An exemplary real angle would be approximately 55°.

Figure 1:
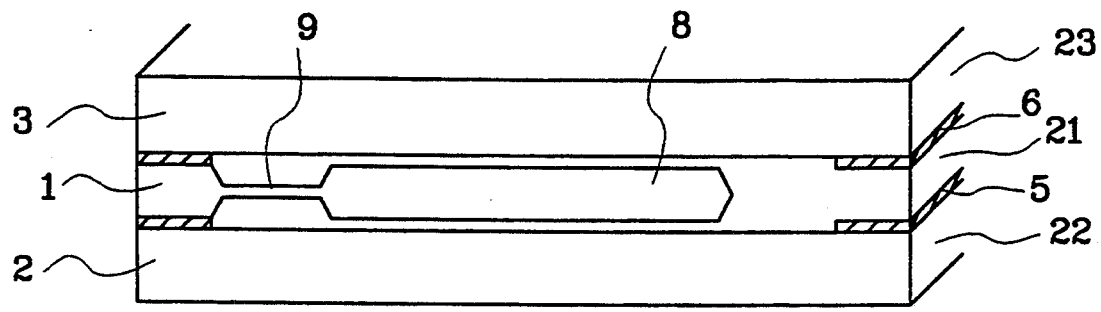
FIGS. 1 and 2, above described, are schematic cross-sectional views of an acceleration micro-sensor and a pressure micro-sensor of the prior art.
Figure 2:
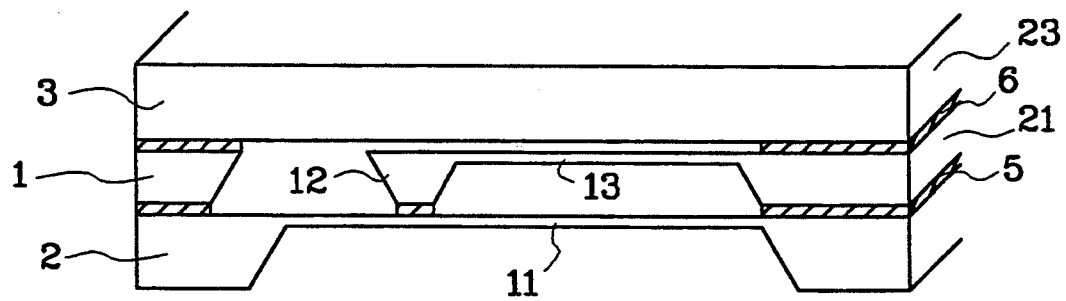

The following description of preferred embodiments of the invention is made in relation with an acceleration micro-sensor structure corresponding to the structure of FIG. 1. However, the invention generally applies to other types of micro-sensors formed by the assembly of several silicon plates.

DETAILED DESCRIPTION

Figure 3:
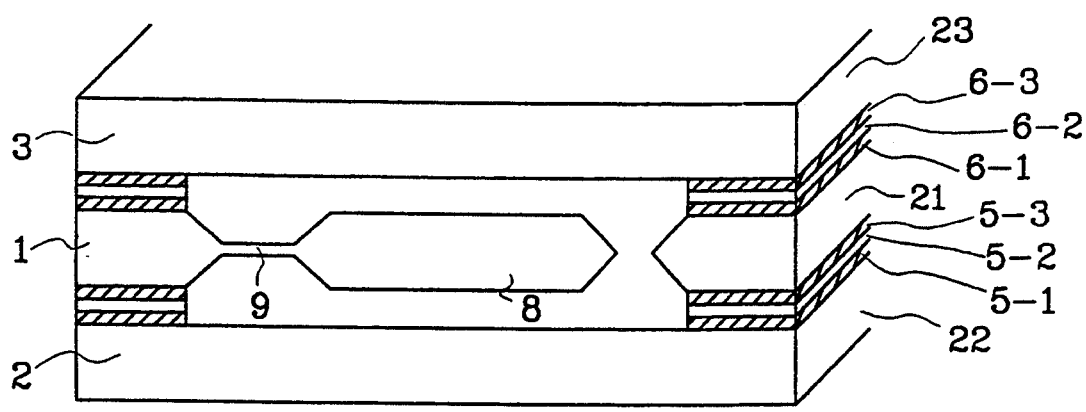
FIG. 3 is a cross-sectional view of an embodiment of an acceleration micro-sensor according to the invention.

FIG. 3 is a schematic cross-sectional view of an acceleration micro-sensor modified according to the invention. In FIG. 3, elements analogous to the elements of FIG. 1 are designated with the same reference numerals. Each insulating layer 5 and 6 of FIG. 1 is replaced by a sandwich including a conductive layer disposed between two insulating layers. Thus, the insulating layer 5 is replaced by an insulating layer 5-1, a conductive layer 5-2, and an insulating layer 5-3. Similarly, the insulating layer 6 is divided into an insulating layer 6-1, a conductive layer 6-2, and an insulating layer 6-3.

Figure 4:
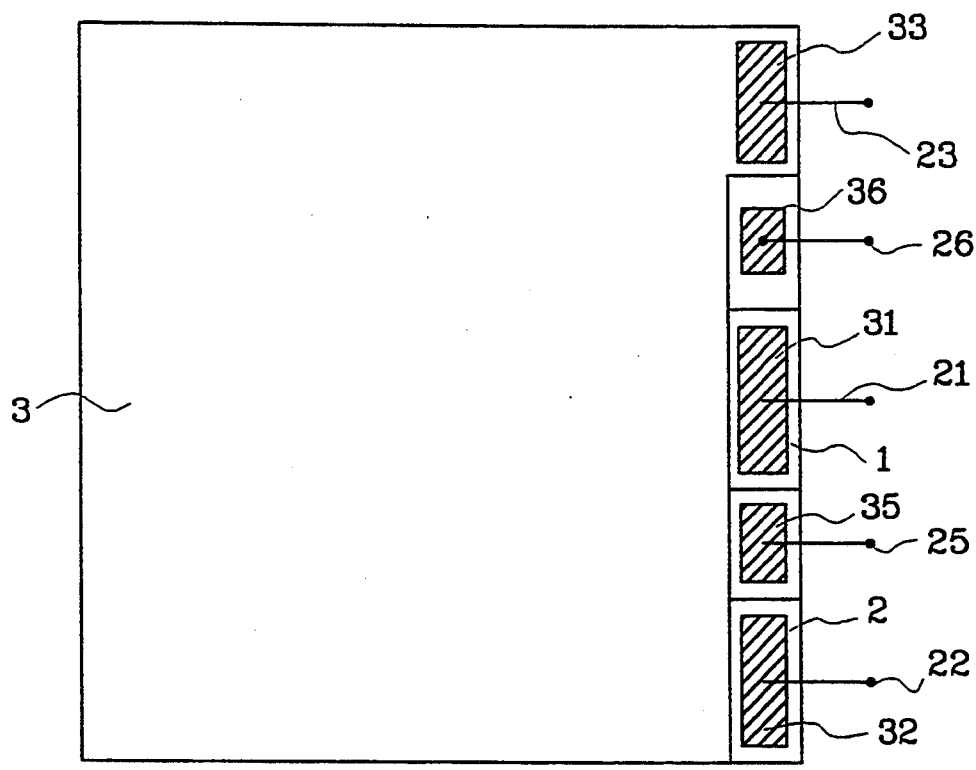
FIG. 4 is a top view of an embodiment of a micro-sensor according to the invention.

FIG. 4 is a schematic top view of the device of FIG. 3 and schematically shows how plates 1, 2 and 3, and conductive layers 5-2 and 6-2 can be contacted. This arrangement is obtained by providing successive apertures in the superimposed plates and layers. Thus, a metallization 33 on plate 3 corresponds to connection 23; a metallization 31 on plate 1 corresponds to connection 21, and a metallization 32 on plate 2 corresponds to connection 22. Additionally, metallizations 35 and 36 on conductive layers 5-2 and 6-2 respectively correspond to connections 25 and 26.

Figure 5:
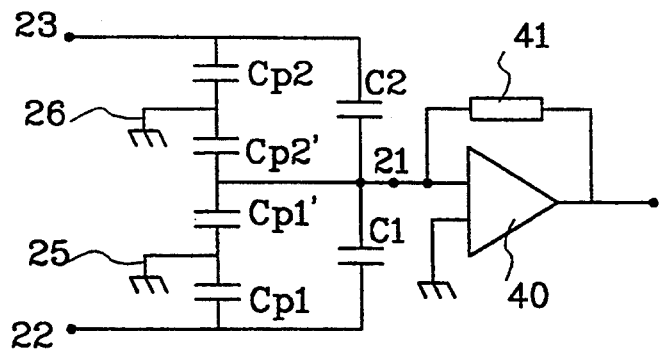
FIG. 5 is an electric diagram showing out the advantages of the invention.

The advantage of the provision of the conductive layers 5-2 and 6-2 appears from the electric diagram of FIG. 5. FIG. 5 shows again terminals 21, 22 and 23. Capacitor C1 corresponds to the capacity between plate 2 and inertia block 8. Capacitor C2 corresponds to the capacity between plate 3 and inertia block 8. The stray capacity between the lower plate 2 and the central plate 1 mainly corresponds to two serial stray capacities Cp1 and Cp1' disposed between terminals 22 and 21. The junction of capacities Cp1 and Cp1' is connected to a terminal 25. Similarly, the stray capacity between plates 1 and 3 mainly corresponds to two serial stray capacities Cp2 and Cp2' disposed between terminals 21 and 23. The junction of capacities Cp2 and Cp2' is connected to a terminal 26. The right-hand portion of FIG. 5 shows the conventional input stage of a capacitance measuring system including an operational amplifier 40 whose output is fed back to the first input through an impedance 41. The first input of the operational amplifier is connected to terminal 21 and the second input to a reference voltage, such as ground. Thus, terminal 21 is at a floating voltage corresponding to the reference voltage. In most cases, d.c. and a.c. voltages are symmetrically applied to terminals 22 and 23. When terminals 25 and 26 are connected to the same reference voltage as the second input of amplifier 40, for example ground, the stray capacities will no longer affect measurement whatsoever since the two terminals of capacitors Cp1' and Cp2' are at the same voltage.

FIGS. 6A–7B schematically illustrate a first method for manufacturing a device according to the invention.

FIGS. 6A–6D schematically show successive steps for forming the central plate.

Figure 6A:
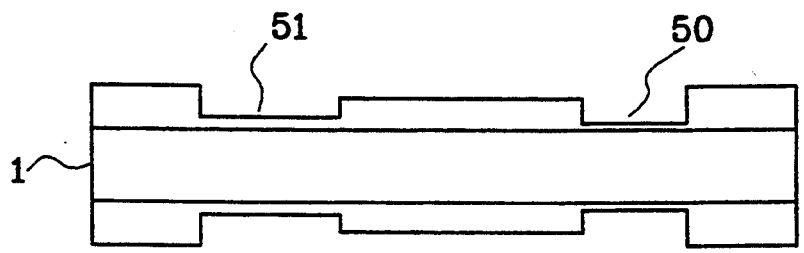
FIGS. 6A–6D schematically show successive manufacturing steps of a central plate according to a first embodiment of the invention.

In FIG. 6A, the plate is initially symmetrically coated with a thin oxide mask in a region 50 and with a slightly thicker oxide mask in a region 51.

Figure 6B:
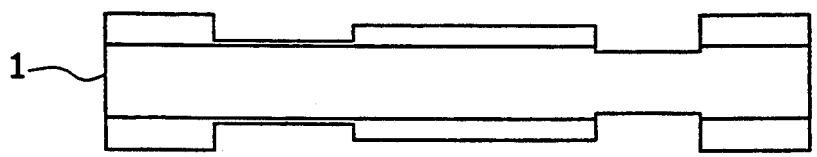

At the step of FIG. 6B, the oxide layer above regions 50 is eliminated and grooves are formed in the plate.

Figure 6C:
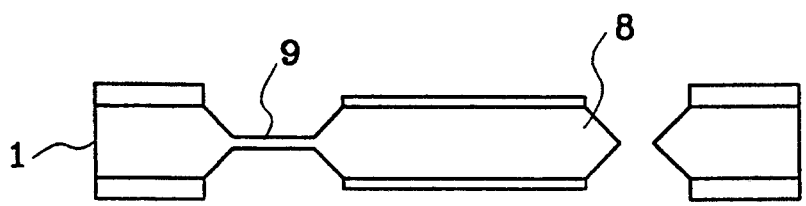

At the step of FIG. 6C, the oxide layer 51 is eliminated and chemical etching has been carried out by using the remaining oxide layers as a mask to etch the inertia block 8 and to form the suspension rods 9.

Figure 6D:
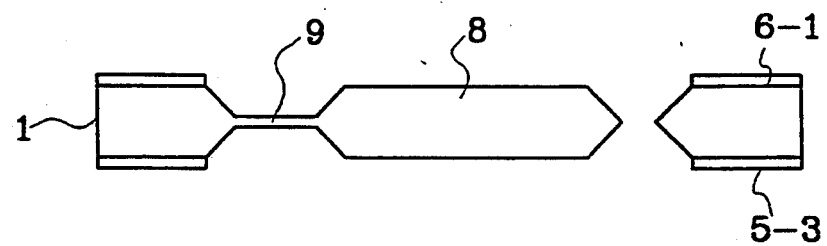

Lastly, at the step of FIG. 6D, oxide is etched away to eliminate oxide layers on the main sides of the inertia block 8 and to leave oxide layers at the periphery of the plate; those oxide layers correspond to layers 5-3 and 6-1 of FIG. 3.

Figure 7A:
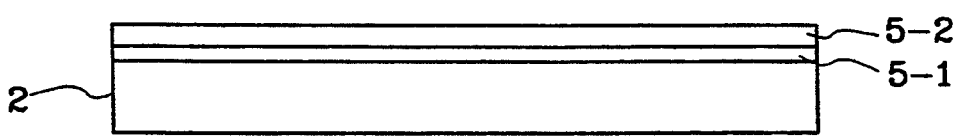
FIGS. 7A and 7B schematically show successive manufacturing steps of an external plate according to the first embodiment of the invention.
Figure 7B:
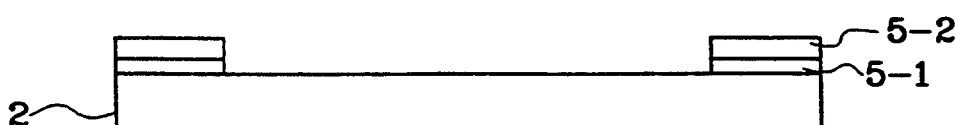

FIGS. 7A and 7B schematically show two successive steps for manufacturing external plates, such as plate 2. During a first step, an oxide layer 5-1 is formed, for example through thermal oxidation. Then a polysilicon layer 5-2 is deposited, for example through chemical vapor deposition, on the oxide layer. Lastly, the polysilicon and oxide layers are etched in order to leave in place, as shown in FIG. 7B, the lateral regions corresponding to layers 5-1 and 5-2 of FIG. 3.

The next manufacturing step consists in assembling the three plates. The polysilicon layer 5-2 is disposed in front of the oxide layer 5-3, and the polysilicon layer 6-2 is disposed in front of the oxide layer 6-1. Then, welding is achieved at a temperature within the range of approximately 900°–1100° C.

To obtain satisfactory welding, the granularity of the polysilicon layer must be slight. That is why the layer is preferably deposited onto a thermal oxide layer rather than onto a deposited oxide layer, which would have a more uneven surface.

Figure 8:
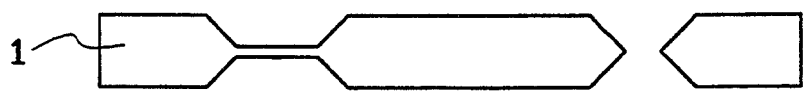
FIG. 8 schematically shows a second embodiment of a central plate according to the invention.
Figure 9A:
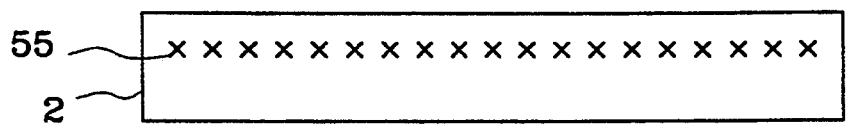
FIGS. 9A–9D schematically show successive manufacturing steps an external plate according to the second embodiment of the invention.
Figure 9B:
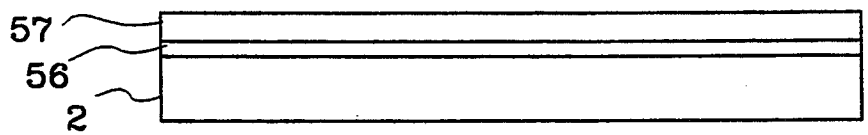
Figure 9C:
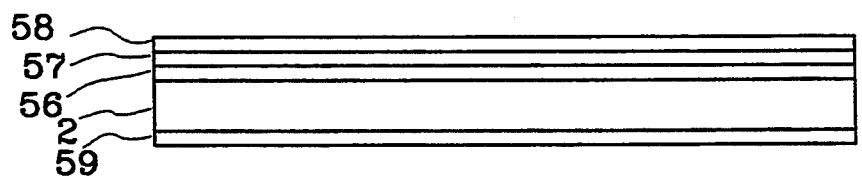
Figure 9D:
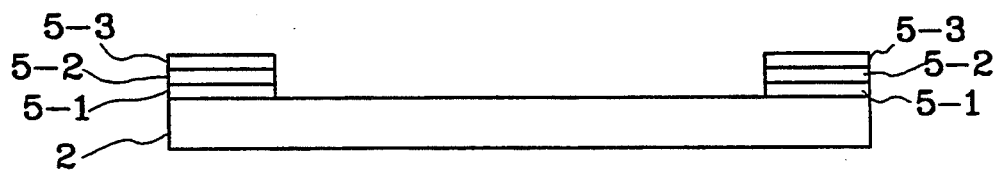

FIGS. 8–9D schematically show a second embodiment of a structure according to the invention.

FIG. 8 shows the shape of the pre-etched plate 1. It will be noted that in this embodiment, no oxide layer is provided on the plate.

FIGS. 9A–9D schematically show successive steps for manufacturing an external plate, such as plate 2.

During a first step, illustrated in FIG. 9A, oxygen atoms 55 are implanted beneath the upper surface of the single-crystal silicon plate 2.

During a second step, illustrated in FIG. 9B, annealing is carried out to provide an oxide layer 56 coated with a silicon layer 57. The surface aspect of the silicon layer 57 substantially corresponds to the aspect of the initial surface of the single-crystal silicon layer 2, and has therefore a smooth surface.

During the step illustrated in FIG. 9C, thermal oxidation has been carried out to form at the surface of the silicon layer 57 a silicon oxide layer 58. Possibly, an oxide layer 59 is simultaneously formed on the rear surface of plate 2 and is then eliminated.

FIG. 9D shows the structure obtained after etching of layers 56, 57, 58, to leave in place only a frame formed by a sandwich of a silicon oxide layer 5-1, a single-crystal silicon layer 5-2 and a second silicon oxide layer 5-3.

An advantage of the second embodiment is that the surface evenness of the external oxide layer is excellent; therefore, the subsequent welding operation with plate 1 is particularly satisfactory.

The second method is liable of various variants. For example, if the silicon layer 57 is not thick enough, silicon can be epitaxially grown above layer 57 in order to thicken it. Such an epitaxial growth allows to maintain an excellent surface quality.

As is apparent to those skilled in the art, various modifications can be made to the above disclosed preferred embodiments. For example, once the three plates are assembled, the external surface of the external plates can be oxidized and plated with a metal layer forming a shield, and can be grounded to protect the device against parasitic overvoltages. Additionally, methods for manufacturing a specific type of a micro-sensor have been illustrated; it should be noted that the invention generally applies to various micro-sensors of the capacitive or resonance-type in which it is desired to eliminate the influence of the stray capacities associated with the outline of the internal cavity of the sensor.

The manufacturing of a micro-sensor according to the invention has been schematically described and represented. In practice, it will clearly appear to those skilled in the art that this manufacturing results from a collective process, each plate being initially part of a silicon wafer, the separation into individual sensors being made after the end assembling operations and, if required, after the contact operations.

It has been indicated above that the internal portion of the sensor is an area below atmospheric pressure. In order to obtain this vacuum, those skilled in the art can use various methods. For example, the plates can be assembled in a vacuum chamber, or pumping can be achieved once the plates have been assembled. Also, the plates can be filled with a gas such as oxygen which is capable of being absorbed, through annealing, by the silicon.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

We claim:

1. A capacitive micro-sensor including a sandwich of three silicon wafers (1,2,3), a peripheral stripe of each surface of the central plate being assembled to a corresponding stripe of an opposing external plate through an insulating layer (5,6), at least one of said external plates forming a first electrode (22,23), the central plate forming a second electrode (21) and at least one portion of said central plate forming a variable capacity with at least one of said external plates, wherein at least one of said insulating layers is formed by a sandwich of a first insulating layer (5-1,6-1), a conductive layer (5-2,6-2) and a second insulating layer (5-3,6-3), said conductive layer being associated with connection means (25,26).

2. The capacitive micro-sensor of claim 1 forming an accelerometer, wherein said portion of the central plate forms an inertia block (8)

3. The capacitive micro-sensor of claim 1 forming a pressure sensor, wherein the lower plate includes a thinner portion (11) forming a diaphragm, said central plate including a stud (12) mounted onto said diaphragm, and a stripe extending between said stud and a peripheral portion of said central plate, said stripe forming with said upper plate a capacitive resonator whose characteristics vary as a function of the applied pressure.

4. The capacitive micro-sensor of claim 1, wherein said conductive layer is set to the reference voltage of the central plate.

5. The capacitive micro-sensor of claim 1, wherein said first and second insulating layers are of silicon oxide and said conductive layer is of polysilicon.

6. The capacitive micro-sensor of claim 1, wherein said first and second insulating layers are of silicon oxide and said conductive layer is of single-crystal silicon.

* * * * *